May 24, 1932.   U. C. PEMBERTON ET AL   1,859,681
ARTIFICIAL BAIT
Filed May 24, 1930
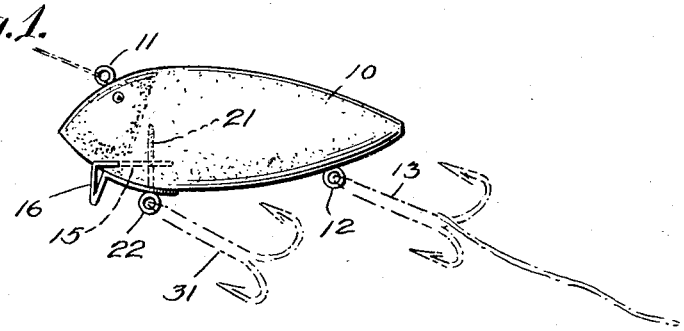
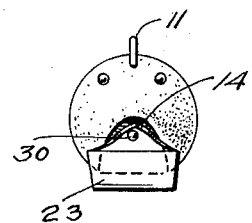
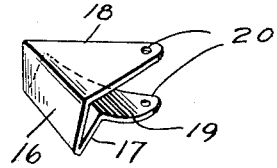
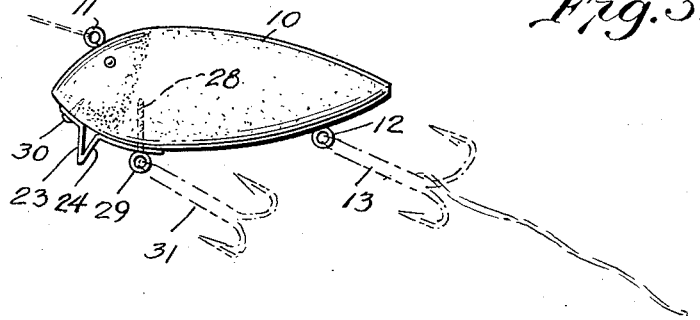
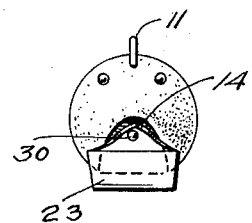
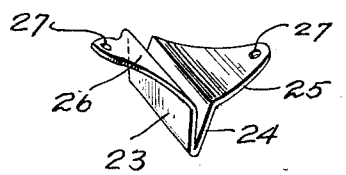
Inventors:
Uz C. Pemberton
Joseph B. Johnson
Eugene C. Brown
Attorney Patented May 24, 1932

1,859,681

UNITED STATES PATENT OFFICE

UZ C. PEMBERTON AND JOSEPH B. JOHNSON, OF TAMPA, FLORIDA

ARTIFICIAL BAIT

Application filed May 24, 1930. Serial No. 455,337.

This invention relates to an artificial bait and has especial reference to a fish lure adapted to be drawn or trolled through the water.

More particularly the invention relates to a fish lure having a transverse fin projecting downwardly from the forward part of the lure body and arranged to cause the lure, upon being drawn through the water, to travel in a sinuous path, such a lure and the action of its transverse fin being described and shown in our copending application executed of even date herewith and bearing the Serial No. 455,336.

Lures used in trolling are frequently drawn through grass and other plants growing in water and also frequently come in contact with pieces of drift wood and other obstructions. The metal parts, such as fins, are made from light gage metal, usually thin brass plated to prevent corrosion, and consequently are readily bent upon striking obstructions. A lure having a transverse fin such as is used in this invention is peculiarly apt to have that fin bent back on striking an obstruction since the impact against the obstruction is at right angles to the flat face of the fin and the full force of the impact is exerted to bend the plate forming the fin along the line least liable to resist bending, that is, the line of its attachment to the lure body.

The principal objects of the present invention are to provide an improved form of lure having such a transverse fin connected to the lure body in such manner as to resist bending upon striking an obstruction; to provide such a fin with a strut between its free edge and the body of the lure; to provide a fin and strut bent from a single piece of sheet metal and having attaching portions or flanges also formed from the same piece of metal integrally with the other parts; and to provide novel means for securing the fin and its strut in position on the body.

With the above and other objects in view preferred forms of the invention will now be described in detail and the invention will then be specifically claimed, reference being had to the accompanying drawings wherein;

Figure 1 is a side elevation of one form of lure constructed in accordance with this invention.

Figure 2 is an end elevation thereof.

Figure 3 is a perspective view of the plate forming the fin, strut and flanges in this form.

Figure 4 is a side elevation of a second form of the invention.

Figure 5 is a front elevation of the second form.

Figure 6 is a perspective view of the plate forming the fin, strut and flanges in the second form.

In both forms of the invention as here shown there is provided a pisciform body 10. A line attaching eye 11 is secured to the body at its forward upper part and a hook attaching eye 12 is secured to the rear under part of the body and carries a hook 13. The forward under part of the body is transversely flattened as at 14.

In the form shown in Figures 1, 2 and 3, a slot 15 extends rearwardly from the flattened portion 14. In order to form the fin, strut and flanges in this form a piece of thin sheet metal is cut to provide a trapezoidal central portion and two substantially triangular end portions. This plate is bent to form a dihedral angle on a line transverse the central portion so that there is provided a transverse fin portion 16 perpendicular to the longitudinal axis and an upwardly and rearwardly extending strut 17. An upper flange 18 is formed by bending the triangular portion projecting from the fin rearwardly at right angles thereto. A lower flange 19 is formed by bending the remaining triangular portion rearwardly and this lower fin is curved to fit the under part of the body 10. The upper flange is seated in the slot 15 and alined openings 20 are formed in the rear ends of the two flanges so that the shank 21 of an eye 22 may be inserted from below into the body and pass through both openings 20 securing both flanges against displacement.

In the form shown in Figures 4, 5 and 6 the slot is omitted. The fin, strut and flanges are formed from a single piece of plate metal shaped substantially as in the first form and, like it, bent to provide a transverse fin 23, strut 24 and lower or rear flange 25. The upper or forward flange 26 in this form is bent forwardly and curved to fit the forward portion 14. Each flange has an opening 27 therein and through the rear opening 27 passes the shank 28 of a hook attaching eye 29. A pin or tack 30 secures the forward flange in position. A hook 31 is carried by the eye 22 in the first form and by the eye 29 in the second form.

In each form the transverse fin has its upper edge fixed to the body and depends therefrom in a plane at right angles to the longitudinal axis of the body, a strut extending from the free lower edge of this fin upwardly and rearwardly to bear against the body and is then secured. Thus the transverse fin is strongly supported against distortion by impact against an object while moving through the water and yet its action to cause the lure to travel in a sinuous path in a vertical plane is in no way limited.

We claim:

A fish lure comprising an elongated body, a transverse fin member located rearwardly of the nose portion of the body and depending perpendicular to the longitudinal axis thereof, a strut member extending upwardly and rearwardly at an acute angle from the lower edge of the fin and attaching flanges extending from the upper edges of the fin and strut respectively and secured to the body.

In testimony whereof we affix our signatures.

UZ C. PEMBERTON.
JOSEPH B. JOHNSON.